US008422988B1

(12) United States Patent
Keshav

(10) Patent No.: US 8,422,988 B1
(45) Date of Patent: Apr. 16, 2013

(54) CONTROLLING ACTIVITY LEVELS AND REDUCING INFRASTRUCTURE DATA TRANSMISSION COSTS FOR WIRELESS MOBILE DEVICES

(75) Inventor: Srinivasan Keshav, Waterloo (CA)

(73) Assignee: Bee Networx Inc., Vaughan, Ontario (CA)

( * ) Notice: Subject to any disclaimer, the term of this patent is extended or adjusted under 35 U.S.C. 154(b) by 639 days.

(21) Appl. No.: 12/537,945

(22) Filed: Aug. 7, 2009

Related U.S. Application Data

(60) Provisional application No. 61/087,139, filed on Aug. 7, 2008, provisional application No. 61/087,143, filed on Aug. 7, 2008.

(51) Int. Cl.
*H04M 11/00* (2006.01)

(52) U.S. Cl.
USPC ......... 455/405; 455/406; 455/414.1; 455/418

(58) Field of Classification Search .................. 455/406, 455/405, 432.3, 414.1, 418
See application file for complete search history.

(56) References Cited

U.S. PATENT DOCUMENTS

| | | | | | |
|---|---|---|---|---|---|
| 5,684,861 | A * | 11/1997 | Lewis et al. | ..................... | 455/405 |
| 6,131,024 | A * | 10/2000 | Boltz | .............................. | 455/405 |
| 7,167,699 | B1 * | 1/2007 | Kretsinger | ...................... | 455/405 |
| 7,274,928 | B2 * | 9/2007 | Netanel et al. | ................. | 455/415 |
| 7,280,818 | B2 * | 10/2007 | Clayton | .......................... | 455/407 |
| 7,310,415 | B1 * | 12/2007 | Short | ............................... | 379/130 |
| 7,366,493 | B2 * | 4/2008 | Marsh et al. | .................... | 455/405 |
| 7,623,843 | B2 * | 11/2009 | Squibbs | .......................... | 455/407 |
| 7,650,137 | B2 * | 1/2010 | Jobs et al. | ....................... | 455/405 |
| 7,657,250 | B2 * | 2/2010 | Clayton | .......................... | 455/407 |
| 7,817,983 | B2 * | 10/2010 | Cassett et al. | .................. | 455/405 |
| 8,009,817 | B2 * | 8/2011 | Short | .............................. | 379/130 |
| 2002/0151293 | A1 * | 10/2002 | Tysor | .............................. | 455/406 |
| 2003/0129974 | A1 * | 7/2003 | Viitala | ........................... | 455/414 |
| 2004/0203587 | A1 * | 10/2004 | Bekanich | ....................... | 455/407 |
| 2004/0209595 | A1 * | 10/2004 | Bekanich | ....................... | 455/405 |
| 2005/0032505 | A1 * | 2/2005 | Himelhoch | .................... | 455/405 |
| 2005/0107065 | A1 * | 5/2005 | Bernhart | ........................ | 455/405 |
| 2006/0040642 | A1 * | 2/2006 | Boris et al. | ..................... | 455/407 |
| 2006/0045245 | A1 * | 3/2006 | Aaron et al. | ................... | 379/111 |

(Continued)

OTHER PUBLICATIONS

"Monitor your cell phone usage with Minute Watcher"—Moonsider Mobile—May 6, 2006 http://www.moonsidermobile.com/monitor-your-cell-phone-usage-with-minutewatcher/.*

(Continued)

*Primary Examiner* — Kamran Afshar
*Assistant Examiner* — Mong-Thuy Tran
(74) *Attorney, Agent, or Firm* — Brill Law Office; Jeffrey Brill

(57) ABSTRACT

Activity levels are controlled and transmission costs are reduced for wireless mobile devices. Power consumption is optimized. Mobile device based activities are categorized according to importance, and associated with power thresholds. Actions are specified to perform responsive to the level of the battery dropping below specific power thresholds. The battery is periodically polled to determine its current level. Responsive to the current level dropping below a given power threshold, the associated action(s) are performed. Communication activity is also optimized in compliance with a service plan. A current service plan copy is maintained on the mobile device. Actions are specified to take when communication reaches given usage thresholds within a plan period. Communication use is tracked, and compared with usage thresholds. Responsive to communication reaching a threshold within a plan period, the associated action(s) are performed.

20 Claims, 3 Drawing Sheets

U.S. PATENT DOCUMENTS

| | | |
|---|---|---|
| 2006/0276180 A1* | 12/2006 | Henry .................. 455/412.2 |
| 2007/0099609 A1* | 5/2007 | Cai ........................ 455/428 |
| 2007/0123297 A1* | 5/2007 | Chan et al. ............. 455/550.1 |
| 2007/0254628 A1* | 11/2007 | Rybak ..................... 455/405 |
| 2008/0045179 A1* | 2/2008 | Bekanich et al. ......... 455/405 |
| 2008/0049745 A1* | 2/2008 | Edwards et al. ......... 370/389 |
| 2008/0167033 A1* | 7/2008 | Beckers .................. 455/432.3 |
| 2008/0294537 A1* | 11/2008 | Mishra et al. ............ 705/30 |
| 2009/0054030 A1* | 2/2009 | Golds ...................... 455/406 |
| 2009/0068984 A1* | 3/2009 | Burnett .................... 455/408 |
| 2009/0203352 A1* | 8/2009 | Fordon et al. ........... 455/406 |
| 2010/0022216 A1* | 1/2010 | Bandera et al. .......... 455/405 |

OTHER PUBLICATIONS

"Utilizing Mobile Phones as Ambient Information Displays"—Schmidt et al.—Apr. 22-27, 2006.*

* cited by examiner

CONTROLLING ACTIVITY LEVELS AND REDUCING INFRASTRUCTURE DATA TRANSMISSION COSTS FOR WIRELESS MOBILE DEVICES

PRIORITY CLAIMS

This patent application claims the benefit of provisional application Ser. No. 61/087,139, titled "Controlling Activity Levels for Energy-constrained Wireless Mobile Devices," filed on Aug. 7, 2008, the entirety of which is hereby incorporated by reference. This patent application also claims the benefit of provisional application Ser. No. 61/087,143, titled "Reducing Infrastructure Data Transmission Costs for Wireless Mobile Devices," filed on Aug. 7, 2008, the entirety of which is hereby incorporated by reference.

TECHNICAL FIELD

This disclosure pertains generally to mobile communication devices, and more specifically to controlling activity levels and reducing infrastructure data transmission costs for wireless mobile devices.

BACKGROUND

The use of highly-capable mobile communication devices such as the iPhone®, the BlackBerry® and the Treo® is increasing rapidly. Such devices often transmit and receive large amounts of data such as video and audio clips, photographs and email attachments. Although contemporary mobile communication devices are capable of creating and utilizing these types of media content, they do not intelligently use the communication media available to them to optimize transmission and receipt of media files. Instead, mobile communication devices tend to immediately send or receive data, insensitive to the cost charged by operators, the type of service currently available or the remaining battery life. This can result not only in large bills for consumers, but also in the rapid loss of battery life, making the device useless until it is recharged. These problems are exacerbated by factors such as the proliferation of connectivity options, the wide variations in carrier data plans and treatment of device roaming, transient appearance and disappearance of short-range wireless connectivity and the need to balance user expectations and device capabilities.

Mobile communication devices are powered by rechargeable batteries. It takes significantly more power to run contemporary multi-media applications than to simply transmit voice data. Thus, batteries run down more quickly, and mobile communication devices are almost always energy-constrained. The limited amount of available battery power must be allocated to both data and voice transmission. Contemporary mobile communication devices, however, are not particularly energy aware. At best, they inform the user when the battery level is low, and expect the user to decide which functions and activities to disable or not use. This makes the experience intrusive to the user. Furthermore, most users do not know how much power given functions or activities use, or how to go about managing the limited amount of available battery power. It would be desirable to address these shortcomings.

Additionally, contemporary mobile communication devices typically have more than one wireless network interface. Many contemporary mobile communication devices have a short-range wireless interface (e.g., WiFi, Bluetooth) and a long-range wireless interface (e.g., a cellular interface such as GPRS, EDGE, 3G). Additionally, mobile communication devices can be docked, in which case wired connectivity is available. Importantly, these different network interfaces vary widely in coverage, cost, and capability. For example, WiFi has limited coverage, low cost, and high capacity. In contrast, GPRS has extensive coverage, high cost, and low capacity. Mobile devices today obtain data transfer services both from WiFi networks as well from long-range wireless data networks such as GPRS, EDGE, and 3G.

Long-range wireless networks are convenient, but expensive to use. Moreover, they typically are accessed according to complicated usage plans, which allow transmission of a certain number of voice minutes, Megabytes (MB), incoming and outgoing text messages, etc., with varying charges for overage in these different categories. It is difficult for users to track their usage and to prioritize it according to these plans. Users can keep track of their minutes used, messages sent, etc., and periodically compare these figures to their plans manually. However, this is cumbersome, to say the least, and most users simply do not do so.

Most users simply pick a plan that they think will work for them. However, not only do users not keep track of their usage as they go, but the corresponding plan parameters change over time. As a result, many users do not have the best plans for their actual usage pattern, nor do they optimize their usage for the plans they do have. It would be desirable to address these shortcomings as well.

SUMMARY

Activity levels are controlled and infrastructure data transmission costs are reduced for wireless mobile devices. In one embodiment, power consumption on a mobile communication device is optimized. Mobile communication device based activities are categorized according to importance, and associated with power thresholds. Actions are specified to take responsive to the power level of the battery dropping below specific power thresholds associated with categories of activities. The battery is periodically polled to determine its current power level. Responsive to the current power level of the battery dropping below a given power threshold, the associated action(s) are automatically performed. For example, a specific category of mobile communication device activities could be disabled responsive to the power dropping below the associated threshold. Another example is for network access to be blocked for a given class of activities once the power level drops below the associated threshold.

In another embodiment, communication activity on the mobile communication device is optimized in compliance with a service plan. A copy of the current service plan in use is maintained by the mobile communication device. Actions are specified to take when communication activity use reaches a usage threshold within a plan period. Communication use on the mobile communication device is tracked, and compared with usage thresholds. Responsive to tracked communication use reaching a given usage threshold within a plan period, the associated action(s) are performed. For example, responsive to a usage threshold being reached, the user could be alerted, certain communication activities could be terminated, and/or the user could be required to explicitly pre-authorize certain types of communication activities.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
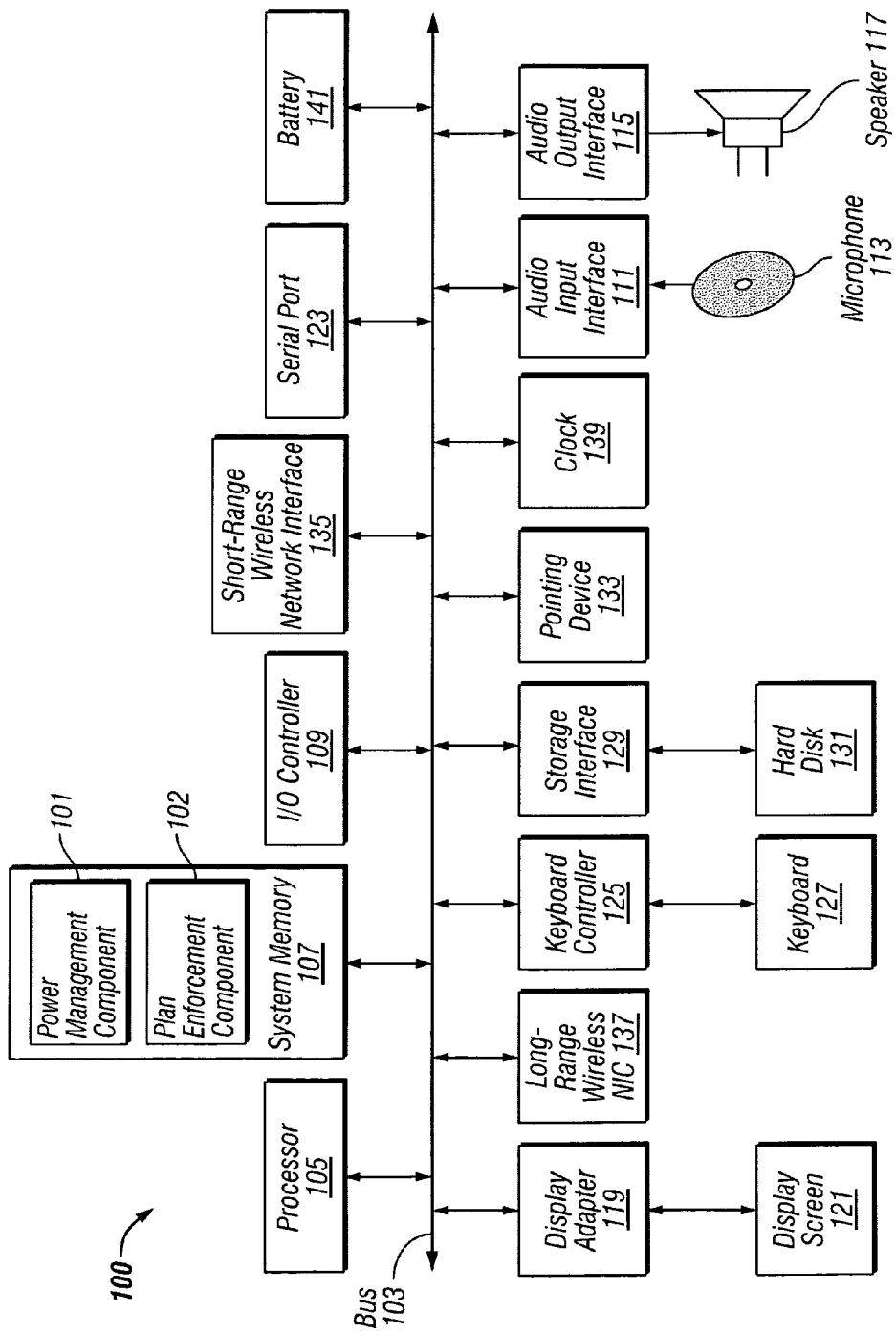
FIG. 1 is a block diagram of a mobile communication device suitable for implementing a power management component and a plan enforcement component, according to some embodiments.

FIG. 1 is a block diagram of a mobile communication device 100 suitable for implementing a power management component 101 and a plan enforcement component 102. As used herein the term "mobile communication device 100" means a battery 141 powered computing device with network access that can be practicably moved between and used in different physical locations. Examples of mobile communication devices 100 include but are not limited to, smartphones, personal digital assistants, netbook computers, laptop computers, etc. As illustrated, one component of the mobile communication device 100 is a bus 103. The bus 103 communicatively couples other components of the mobile communication device 100, such as at least one processor 105, system memory 107 (e.g., random access memory (RAM), read-only memory (ROM), flash memory), an input/output (I/O) controller 109, an audio input interface 111 communicatively coupled to an audio input device 113 such as a microphone, an audio output interface 115 communicatively coupled to an audio output device 117 such as a speaker, a display adapter 119 communicatively coupled to a video output device such as a display screen 121, one or more interfaces 123 such as serial ports, Universal Serial Bus (USB) receptacles, etc., a keyboard controller 125 communicatively coupled to a keyboard 127, a storage interface 129 communicatively coupled to at least one hard disk 131 (or other form(s) of magnetic, optical and/or other type of storage media), a pointing device 133 coupled to the bus 103, a short-range wireless (e.g. WiFi, Bluetooth) network interface card (NIC) 135 or other form of short-range wireless interface, coupled, e.g., directly to the bus 103, a long-range wireless NIC 137 (e.g., GPRS, EDGE, etc.), one or more other types of NICs 138 or similar (e.g., for interfacing with network types such as wired, etc.) and a rechargeable power source such as a battery 141. All of the components illustrated in FIG. 1 need not be present. Furthermore, the components can be interconnected in different ways from that shown in FIG. 1.

The bus 103 allows data communication between the processor 105 and system memory 107, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., magnetic or optical disk 131) and loaded into system memory 107 and executed by the processor 105. Application programs can also be loaded into system memory 107 from a remote location (i.e., a remotely located computing device), for example via a NIC 135. In FIG. 1, the power management component 101 and the plan enforcement component 102 are illustrated as residing in system memory 107. The workings of the power management component 101 are explained in greater detail below in conjunction with FIG. 2. The workings of the plan enforcement component 102 are explained in greater detail below in conjunction with FIG. 3.

The storage interface 129 is coupled to one or more hard disks 131 (and/or other storage media). The network interface (s) 135, 137 can be directly or indirectly communicatively coupled to a network such as the Internet. Such coupling can be wired or wireless.

Figure 2:
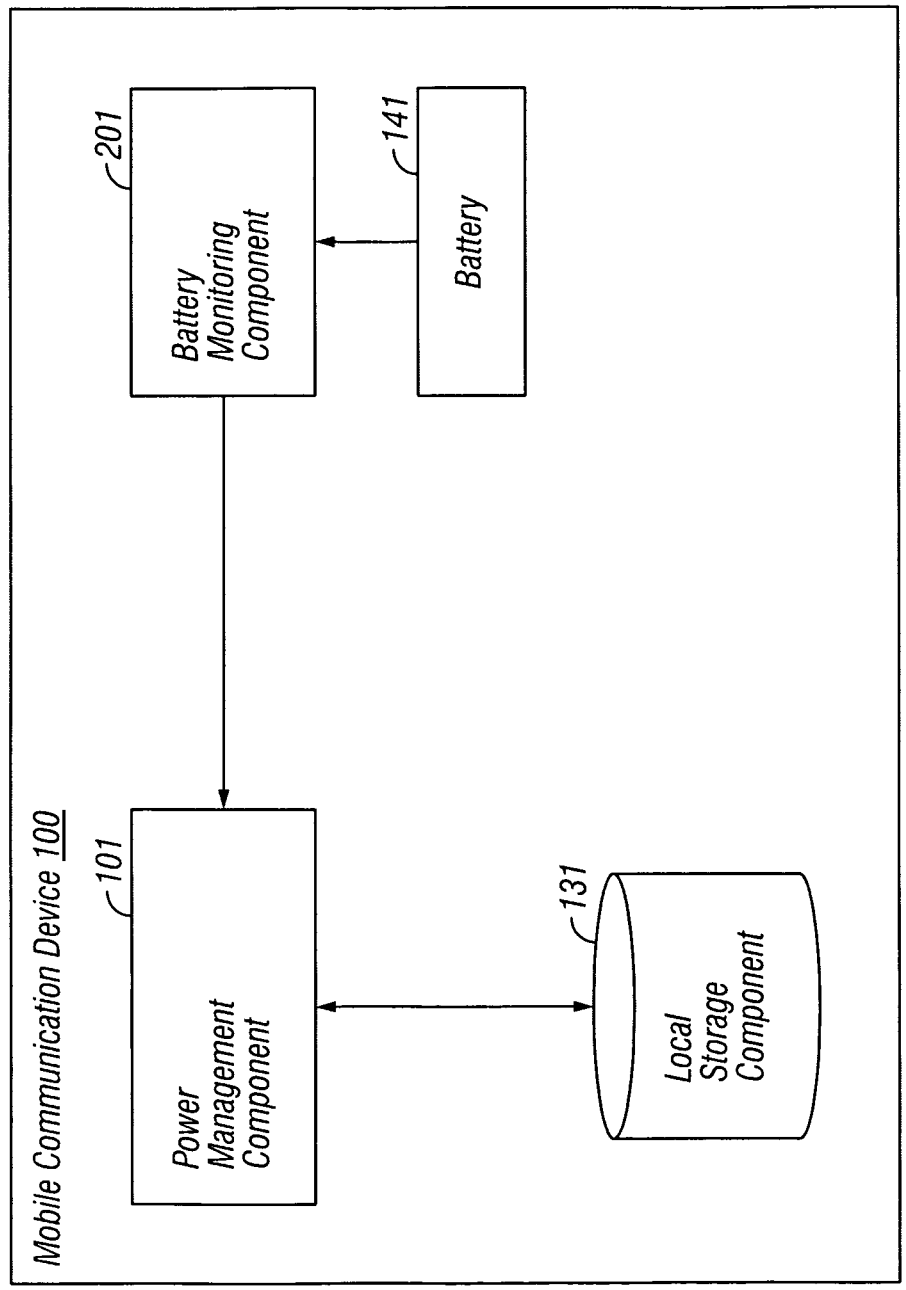
FIG. 2 is a block diagram of illustrating the operations of a power management component, according to some embodiments.

FIG. 2 illustrates a power management component 101, according to some embodiments. The power management component 101 is illustrated as residing on a mobile communication device 100. It is to be understood that although the power management component 101 is illustrated in FIG. 2 as a separate entity, the illustrated power management component 101 represents a collection of functionalities, which can be instantiated as fewer, more or overlapping components as desired. It is to be understood that the components of the power management component 101 can be instantiated (for example as object code or executable images) within the system memory 107 (e.g., RAM, ROM, flash memory) of a mobile communication device 100 (or other type of computing device), such that when the processor 105 of the mobile communication device 100 processes a component, the mobile communication device 100 executes the associated functionality. Additionally, program code to implement the functionalities of the power management component 101 can be stored on computer-readable storage media, such that the program code can be loaded from the computer-readable storage media into the system memory 107 of a mobile communication device 100 (or other type of computing device), and executed by its processor 105. Any form of tangible computer readable storage medium can be used in this context, such as magnetic or optical storage media. As used herein, the term "computer readable storage medium" does not mean an electrical signal separate from an underlying physical medium. As used herein, the terms "computer system," "computer," and "computing device" mean one or more computers configured and/or programmed to execute the described functionality.

As illustrated in FIG. 2, in addition to the power management component 101, also present on the mobile communication device 100 are a battery 141, a battery monitoring component 201 and a local storage component 131 (e.g., a hard drive or similar).

Mobile communication device 100 based activities and functionalities are categorized according to importance. In some embodiments, default categorizations are used, which can be edited by a user or administrator. In other embodiments, a user or administrator categorizes activities and functionalities, e.g., through a graphical user or text based interface. For example, a user might categorize receiving voice calls as a most important activity, making voice calls as a very important activity, text emailing and text messaging as important activities, processing photographs and sound files as somewhat important activities, processing full motion video as a slightly important activity and playing games as an unimportant activity.

These are simply examples of functionalities and activities, and the types of categorizations that can be made thereto. Functionalities and activities can be categorized at any level of granularity. For example, specific functionalities and activities can be categorized, such as receive voice call, make voice call, transmit text, receive text, etc. Additionally, individual applications running on the mobile communication device 100 can be categorized (e.g., a specific application for forwarding audiovisual signals from a user's desktop computer or television to the mobile communication device 100). Note that functionalities and activities need not be communication based. For example, in different embodiments watching video, playing back MP3 files, playing games, playing a specific game, using a calendar program, etc. could all be categorized. In one embodiment, the power management component 101 can categorize each application installed on the mobile communication device 100, as one or more functionalities and/or activities. Typically, all functionalities and activities not specifically categorized are considered to be a default functionality or activity.

Categories of activities and functionalities are associated with power thresholds, such that when the available battery 141 power of the mobile communication device 100 drops below a given threshold, an associated action is executed as described below. Thresholds can be associated with categorizations by a user or administrator, for example through a user interface. The power management component 101 can also associate default thresholds with categorizations. It is to be understood that in some embodiments, thresholds are associated directly with activities or functionalities based on importance, rather than to categorizations of activities or functionalities per se.

Actions to take when the power level drops below thresholds associated with various activities or functionalities are also specified. As with categorizations and thresholds, actions can be specified by users and/or administrators, or default actions can be supplied by the power management component 101. Actions can be specified at the level of individual activities or functionalities, or at the level of classes of activities or functionalities. One common action is for the power management component 101 to disable an activity if the power level falls below the associated threshold. For example, the power management component 101 could disable a specific video playing application responsive to the power dropping below the associated threshold. Another example is for the power management component 101 to block network access for a given class of activities or functionalities (e.g., all processes that attempt to transmit or receive graphics files) once the power level drops below the associated threshold.

The power management component 101 can store importance categorizations for activities and functionalities, as well as associated thresholds and actions, on the local storage component 131. The battery monitoring component 201 periodically polls the battery 141 to determine the remaining power level. The battery monitoring component 201 reports this information to the power management component 101. When the power management component 101 receives an indication of the current remaining power level, it compares this level with the stored thresholds. When the remaining power level falls below a given threshold, the power management component 101 performs the associated stored action(s).

In other words, thresholds are set and the power management component 101 enforces them. For example, suppose a user associates a threshold of 0% with incoming calls, 5% with outgoing calls, 10% with urgent data transmission, and 25% with bulk data transmission, specifying that in each case, the action to take once the power level drops below the threshold is to disable the activity. Under these associations, the power management component 101 ensures that no bulk data is sent or received once the battery 141 level drops below 25%, that not even urgent data is sent or received once the level drops below 10%, and so on.

As another example, consider the following scenario: when the battery 141 has less than 20% capacity, no data is to be transferred on the long-range wireless NIC 137 (i.e., GPRS or EDGE), and 2) when the battery 141 has less than 10% capacity, no data is to be transferred on the short-range wireless NIC 135 (e.g., WiFi) either. To implement this policy, the use of the long-range wireless NIC 137 is categorized as one activity (say A1), and the use of the short-range wireless NIC 135 as another (say A2). A1 is associated the threshold of 20%, and A2 is associated with the threshold of 10%. Both A1 and A2 are associated with the action of disabling the activity when the threshold is crossed.

Figure 3:
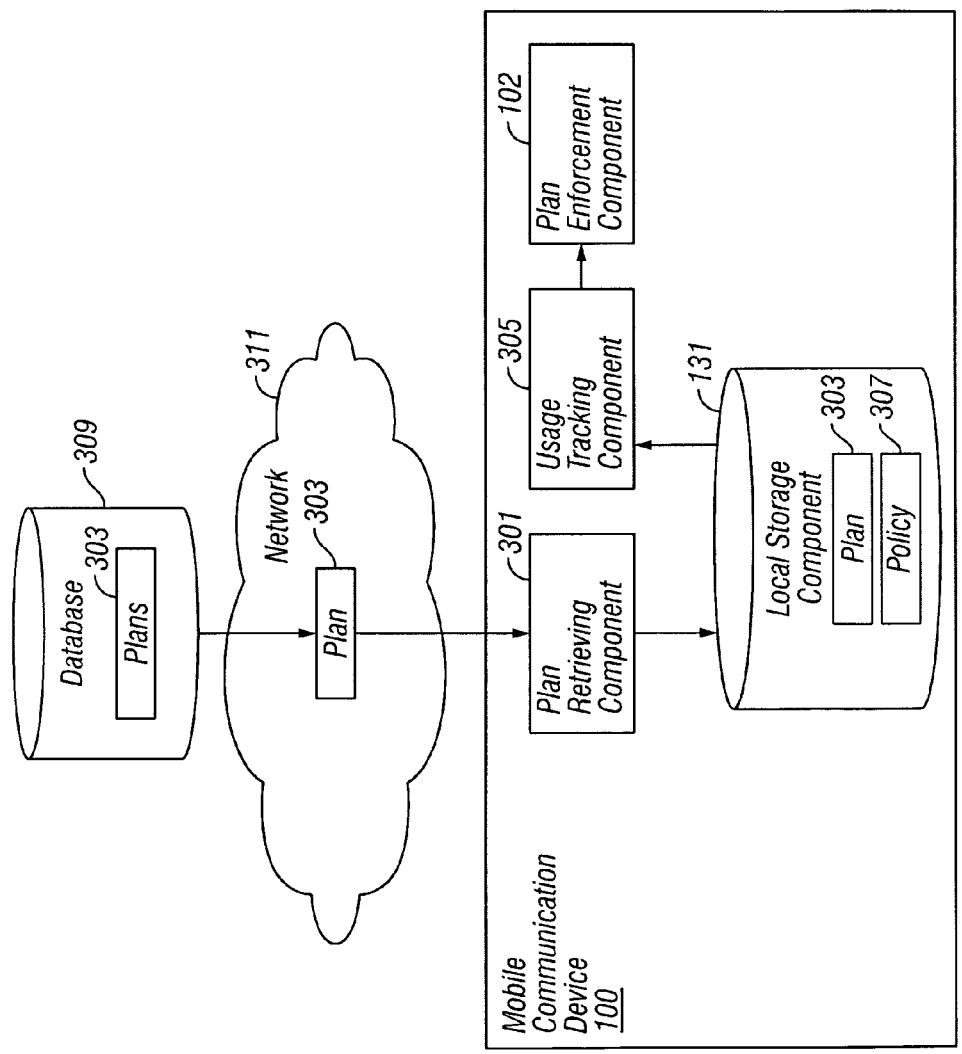
FIG. 3 is a block diagram of illustrating the operations of a plan enforcement component, according to some embodiments.

FIG. 3 illustrates a plan enforcement component 102, according to some embodiments. The plan enforcement component 102 is illustrated as residing on a mobile communication device 100. It is to be understood that although the plan enforcement component 102 is illustrated in FIG. 2 as a separate entity, the illustrated plan enforcement component 102 represents a collection of functionalities, which can be instantiated as fewer, more or overlapping components as desired. It is to be understood that the components of the plan enforcement component 102 can be instantiated (for example as object code or executable images) within the system memory 107 (e.g., RAM, ROM, flash memory) of a mobile communication device 100 (or other type of computing device), such that when the processor 105 of the mobile communication device 100 processes a component, the mobile communication device 100 executes the associated functionality. Additionally, program code to implement the functionalities of the plan enforcement component 102 can be stored on computer-readable storage media, such that the program code can be loaded from the computer-readable storage media into the system memory 107 of a mobile communication device 100 (or other type of computing device), and executed by its processor 105. Any form of tangible computer readable storage medium can be used in this context, such as magnetic or optical storage media. As used herein, the term "computer readable storage medium" does not mean an electrical signal separate from an underlying physical medium. As used herein, the terms "computer system," "computer," and "computing device" mean one or more computers configured and/or programmed to execute the described functionality.

As illustrated in FIG. 3, in addition to the plan enforcement component 102, also present on the mobile communication device 100 are a plan retrieving component 301 configured to retrieve current service plans 303, a usage tracking component 305 configured to track usage of each network interface on the mobile communication device 100 (e.g., the short-range wireless NIC 135, the long-range wireless NIC 137, etc.) and a local storage component 131 (e.g., a hard drive or similar) on which a current copy of the user's service plan 303 and the user's policy 307 are stored (user policies 307 are described in greater detail below).

In some embodiments, a centrally located database 309 of service plans 303 is also present. Because only a limited number of providers and service plans 303 exist for mobile communication devices 100 in each country, it is feasible to store these service plans 303 in the centrally located database 309. The database 309 of service plans 303 is accessible to the plan retrieving component 301 on the mobile communicate device 100 over a conventional communication network 311 (e.g., the Internet). The database 309 of service plans 303 can be updated by service providers, operators, administrators and/or third parties when an existing service plan 303 changes or a new service plan 303 becomes available.

The database 309 is periodically accessed by the plan retrieving component 301 (e.g., once an hour, once a day, once every three days) to retrieve a current copy of the service plan 303 in use on the mobile communication device 100 (and stored locally thereon). The plan retrieving component 301 can be provided with an identifier of the service plan 303 in use on the mobile communication device 100, e.g., by a user, operator, administrator or the plan enforcement component 102. In another embodiment, some or all service plans 303 are stored locally on the mobile communication device 100.

A policy 307 is associated with the user, and specifies actions to take responsive to actual usage approaching or exceeding included limits of the service plan 303. The policy can be specified by a user and/or administrator, or a default policy 307 can be supplied by the plan enforcement component 102. Typically, a default policy 307 can be subsequently edited by a user and/or administrator.

A user policy 307 can specify actions to take as actual usage approaches or exceeds plan allowances at any level of granularity. One common action is for a policy to specify that the plan enforcement component 102 is to notify the user of the mobile communication device 100 when actual usage of a communication activity (e.g., voice call minutes used, number of text messages sent, etc.) reaches a specified threshold. (Such a threshold can be in the form of a percentage of the plan's included limit.) Another common action is to require the user to explicitly approve each communication activity of a given type (e.g., incoming or outgoing text message, video transmission, etc.) once a threshold is reached. The user policy can also specify to disable a given type of communication activity responsive to reaching a threshold.

For example, a user policy 307 could specify that once a threshold of 80% of the amount of a given communication activity included in the current plan period has been used, the user is to be notified, e.g., through a visual interface, text message, email, voice call, etc. Once a threshold of 95% has been reached, the policy 307 could specify that the user must explicitly authorize each communication of that type, e.g., by responding positively to a prompt. The policy 307 could also specify to disable the communication activity once 110% of the plan included limit has been used. It is to be understood that this is simply a description of an example user policy 307 specifying example actions to take at example thresholds. In general, enforced user policies 307 enable users to maintain control of their usage, and prevent unpleasant surprises when the monthly bill arrives. Additionally, because the plan retrieving component 301 periodically retrieves the current version of the user's service plan 303, the user need not re-program the mobile communication device 100 if the service plan 303 changes.

The usage tracking component 305 tracks the actual communication that passes across each network interface on the mobile communication device 100. The usage tracking component 305 tracks this communication in whatever units are appropriate based on how the current service plan 303 charges for use (e.g., number of bytes sent and/or received, amount of time given network interface in use, time of use, etc.). The usage tracking component 305 compares the actual tracked usage with the thresholds specified in the user policy 309. Note that the usage tracking component 305 compares usage per service plan period, and resets its tracked values at the beginning of each new plan period. If a threshold specified in the user policy 307 is met during a given plan period, the usage tracking component 305 notifies the plan enforcement component 102.

In response to a threshold within the user policy 307 being met, the plan enforcement component 102 executes the appropriate action(s) specified in the user policy 309. As noted above, these actions can include, for example, generating user alerts, terminating certain communication activities, and/or requiring the user to explicitly authorize certain communication activities. In other words, a user policy 307 is set and the plan enforcement component 102 enforces it.

As will be understood by those familiar with the art, the claimed subject matter may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the claimed subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for optimizing communication activity on a mobile communication device in compliance with a service plan, the method comprising:

retrieving, by a mobile communication device, a current copy of a service plan in use on the mobile communication device from a remote, centrally located storage component, said remote, centrally located storage component maintaining current copies of a plurality of service plans available in a geographical area;

maintaining, by the mobile communication device, the current copy of the service plan in use on the mobile communication device, wherein said maintaining further comprises periodically retrieving the current copy of the service plan in use on the mobile communication device from the remote, centrally located storage component;

associating actions to take with communication activity use reaching at least one usage threshold within a plan period;

tracking communication use on the mobile communication device;

comparing tracked communication use with the at least one usage threshold associated with at least one action; and responsive to tracked communication use reaching a usage threshold within a plan period, performing, by the mobile communication device, at least one action associated with the tracked communication use reaching the usage threshold.

2. The method of claim 1 wherein the remote, centrally located storage component maintaining current copies of a plurality of service plans available in a geographical area further comprises:

maintaining a current copy of each mobile device service plan available in a specific country, by the remote, centrally located storage component.

3. The method of claim 1 wherein maintaining the current copy of the service plan in use on the mobile communication device further comprises:

retrieving, by the mobile communication device, an updated version of the service plan in use on the mobile communication device from the centrally located storage component.

4. The method of claim 1 wherein associating actions to take with communication activity use reaching at least one usage threshold within a plan period further comprises:

maintaining a user policy which associates actions to take with communication activity use reaching at least one usage threshold within a plan period.

5. The method of claim 4 wherein maintaining a user policy which associates actions to take with communication activity use reaching at least one usage threshold within a plan period further comprises:

maintaining a user policy which associates separate actions to take with communication activity use reaching separate ones of a plurality of thresholds within a plan period.

6. The method of claim 4 further comprising:

maintaining a user policy which 1) associates notifying a user with communication activity use reaching a first threshold within the plan period, 2) associates requiring the user to authorize communication activity with communication activity use reaching a second threshold within the plan period and 3) associates disabling communication activity with communication activity use reaching a third threshold within the plan period.

7. The method of claim 1 wherein tracking communication use on the mobile communication device further comprises:

tracking communication use on each of a plurality network interfaces on the mobile communication device.

8. The method of claim 1 wherein tracking communication use on the mobile communication device further comprises:

tracking communication use on a short range wireless network interface on the mobile communication device and on a long range wireless network interface on the mobile communication device.

9. The method of claim 1 wherein performing at least one action associated with tracked communication use reaching a usage threshold further comprises:

notifying a user responsive to the tracked communication use reaching the usage threshold within the plan period.

10. The method of claim 1 wherein performing at least one action associated with tracked communication use reaching a usage threshold further comprises:

requiring a user to authorize communication activity responsive to the tracked communication use reaching the usage threshold within the plan period.

11. The method of claim 1 wherein performing at least one action associated with tracked communication use reaching a usage threshold further comprises:

disabling communication activity responsive to the tracked communication use reaching the usage threshold within the plan period.

12. A non-transitory computer readable medium storing program code that when loaded into computer memory and executed by a processor performs the following steps for optimizing communication activity on a mobile communication device in compliance with a service plan:

retrieving, by a mobile communication device, a current copy of a service plan in use on the mobile communication device from a remote, centrally located storage component, said remote, centrally located storage component maintaining current copies of a plurality of service plans available in a geographical area;

maintaining, by the mobile communication device, the current copy of the service plan in use on the mobile communication device, wherein said maintaining further comprises periodically retrieving the current copy of the service plan in use on the mobile communication device from the remote, centrally located storage component;

associating actions to take with communication activity use reaching at least one usage threshold within a plan period;

tracking communication use on the mobile communication device;

comparing tracked communication use with the at least one usage threshold associated with at least one action; and responsive to tracked communication use reaching a usage threshold within a plan period, performing, by the mobile communication device, at least one action associated with the tracked communication use reaching the usage threshold.

13. The computer readable medium of claim 12 wherein the remote, centrally located storage component maintaining current copies of a plurality of service plans available in a geographical area further comprises:

maintaining a current copy of each mobile device service plan available in a specific country, by the remote, centrally located storage component.

14. The computer readable medium of claim 12 wherein maintaining the current copy of the service plan in use on the mobile communication device further comprises:

retrieving, by the mobile communication device, an updated version of the service plan in use on the mobile communication device from the centrally located storage component.

15. The computer readable medium of claim 12 wherein associating actions to take with communication activity use reaching at least one usage threshold within a plan period further comprises:

maintaining a user policy which associates actions to take with communication activity use reaching at least one usage threshold within a plan period.

16. The computer readable medium of claim 15 wherein maintaining a user policy which associates actions to take with communication activity use reaching at least one usage threshold within a plan period further comprises:

maintaining a user policy which associates separate actions to take with communication activity use reaching separate ones of a plurality of thresholds within a plan period.

17. The computer readable medium of claim 15 further comprising program code for performing the following step:

maintaining a user policy which 1) associates notifying a user with communication activity use reaching a first threshold within the plan period, 2) associates requiring the user to authorize communication activity with communication activity use reaching a second threshold within the plan period and 3) associates disabling communication activity with communication activity use reaching a third threshold within the plan period.

18. The computer readable medium of claim 12 wherein tracking communication use on the mobile communication device further comprises:

tracking communication use on each of a plurality network interfaces on the mobile communication device.

19. The computer readable medium of claim 12 wherein tracking communication use on the mobile communication device further comprises:
tracking communication use on a short range wireless network interface on the mobile communication device and on a long range wireless network interface on the mobile communication device.

20. A mobile communication device configured to optimize communication in compliance with a service plan, the mobile communication device comprising:
a processor;
system memory;
a plan retrieving component configured for retrieving a current copy of a service plan in use on the mobile communication device from a remote, centrally located storage component, said remote, centrally located storage component maintaining current copies of a plurality of service plans available in a geographical area;
wherein said plan retrieving component is further configured for maintaining the current copy of the service plan in use on the mobile communication device, wherein said maintaining further comprises periodically retrieving the current copy of the service plan in use on the mobile communication device from the remote, centrally located storage component;
a usage tracking component configured for tracking communication use on the mobile communication device; and
a plan enforcement component, configured for 1) associating actions to take with communication activity use reaching at least one usage threshold within a plan period, configured for 2) comparing tracked communication use with the at least one usage threshold associated with at least one action and configured for 3) responsive to tracked communication use reaching a usage threshold within a plan period, performing at least one action associated with the tracked communication use reaching the usage threshold.

* * * * *

UNITED STATES PATENT AND TRADEMARK OFFICE
CERTIFICATE OF CORRECTION

PATENT NO. : 8,422,988 B1
APPLICATION NO. : 12/537945
DATED : April 16, 2013
INVENTOR(S) : Srinivasan Keshav It is certified that error appears in the above-identified patent and that said Letters Patent is hereby corrected as shown below:

In the Claims

Col. 9, line 35, replace "plurality network" with "plurality of network"

Col. 10, line 66, replace "plurality network" with "plurality of network"

Signed and Sealed this
Twenty-first Day of May, 2013

Teresa Stanek Rea
*Acting Director of the United States Patent and Trademark Office*